United States Patent
Palfreyman

[15] 3,663,333
[45] May 16, 1972

[54] METHOD OF BONDING MATERIAL HAVING A LOW COEFFICIENT OF FRICTION TO A SUBSTRATE

[72] Inventor: Donald H. Palfreyman, Dedham, Mass.
[73] Assignee: Fabreeka Products Company, Boston, Mass.
[22] Filed: July 18, 1969
[21] Appl. No.: 843,086

[52] U.S. Cl. ............... 156/256, 156/153, 156/267, 156/313, 156/335
[51] Int. Cl. .................................................. B32b 31/12
[58] Field of Search ............... 156/153, 313, 335, 267, 256

[56] References Cited

UNITED STATES PATENTS

| | | | |
|---|---|---|---|
| 3,501,360 | 3/1970 | Mancel | 156/153 |
| 3,403,071 | 9/1968 | Perry et al. | 156/335 |
| 3,396,065 | 8/1968 | Ney | 156/335 |
| 3,377,228 | 4/1968 | Menzer | 156/313 |
| 2,989,433 | 6/1961 | Yuan | 156/313 |

Primary Examiner—Leland A. Sebastian
Assistant Examiner—B. H. Hunt
Attorney—Roberts, Cushman & Grover

[57] ABSTRACT

Method of bonding sheet material having a very low coefficient of friction to a substrate such as rubber, felt or the like, which comprises providing, as an uncured bonding material, cotton textile fabric impregnated with a thermosetting general purpose phenolic resin; buffing the surface of the substrate; placing thereon a ply of the uncured bonding material; placing the low-coefficient material upon the bonding layer and then vulcanizing the assembly.

5 Claims, 2 Drawing Figures

Patented May 16, 1972 3,663,333

Inventor
Donald H. Palfreyman
by Roberts Cushman & Grouse
Att'ys

3,663,333

METHOD OF BONDING MATERIAL HAVING A LOW COEFFICIENT OF FRICTION TO A SUBSTRATE

BACKGROUND OF THE INVENTION

Difficulty has been experienced in bonding a material having a low coefficient of friction, for specific example, the fluoroplastic film known as Teflon manufactured by E. I. duPont de Nemours Co., which is insoluble in most common solvents, "since there are no solvents for Teflon fluoroplastic, techniques other than conventional solvent cementing must be used, duPont recommends that the surfaces of parts fabricated from the fluoroplastic first be modified with strong etching solutions to make them receptive to conventional self-curing adhesive systems." *Modern Plastics Encylcopedia*, Vol. 45, No. 1A, Page 995.

The present invention, as the result of much experimentation, provides a novel method of and means for so uniting such a surface material, having a low coefficient of friction, as for example, Teflon to a substrate of such material as rubber, felt, laminated fabrics, thereby providing an acceptable and permanent bond.

Figure 1:
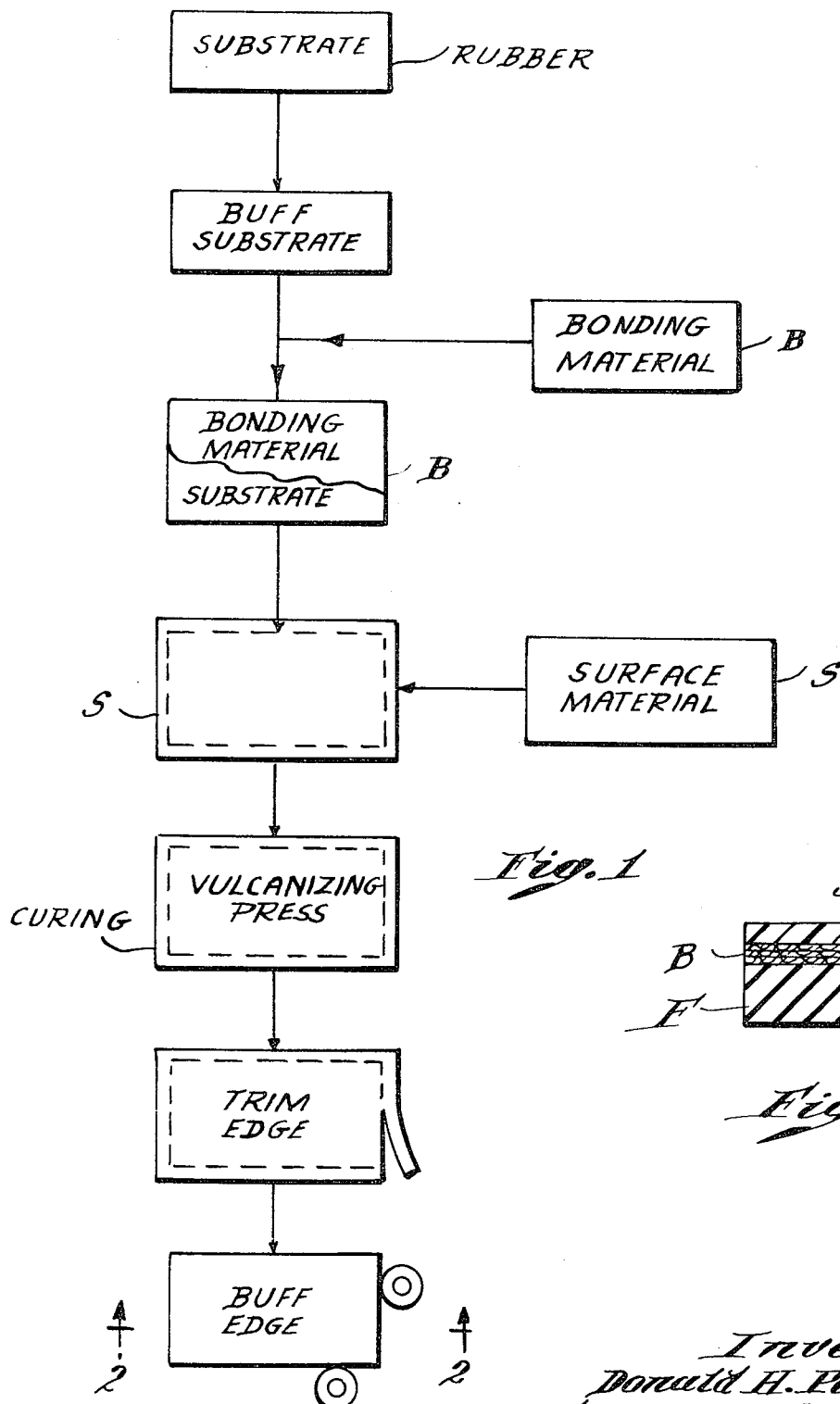
Figure 2:
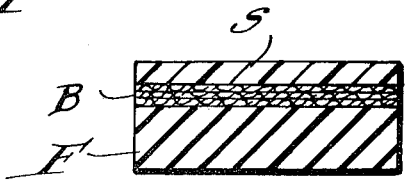

In the annexed drawing:

FIG. 1 is a flow sheet diagrammatically illustrating the several steps of the present method; and FIG. 2 is a diagrammatic section illustrating the completed material.

Assuming, for example, that rubber is the material of the substrate to which the low-coefficient-of-friction material is to be bonded, the first step in the present method is to buff the surface of the rubber substrate to provide a matte texture. There is then provided a ply of uncured bonding material, which may, for example, comprise cotton canvas, of a weight in excess of 4 ounces per square yarn and of a yarn count of approximately 56 warp yarns and 24 double filling yarns per inch, and which has been impregnated with a thermosetting phenolic resin to the extent that, if the impregnated material were cured at this stage, the resin would impart a surface gloss to the textile fabric. The selected resin should have substantial mechanical strength, dimensional stability and corrosion-resistance when cured and desirably the ability to sustain heavy loads even when exposed to high temperatures. A general purpose phenolic resin would have these characteristics. As indicative of these characteristics of this type of resin, note the following quotation:

"Industrial laminates are those materials which are intended for such applications as gears, cams, roll neck bearings, structural shapes, components for switchgear, and so on. General purpose phenolic varnishes are usually used as the impregnant in laminates going into such applications. 1968 Modern Plastics Encyclopedia Vol. 45/No. 1A Page 184."

From the impregnated but uncured bonding material, a piece is cut of a size such as to cover the rubber substrate. This piece of bonding material is then placed upon the buffed surface of the substrate, and a piece of the material (having the low coefficient of friction) is placed upon the bonding layer, said piece preferably being of a size such that it overlaps the bonding material by approximately one-fourth inch all around. The thus assembled plies are then placed in a vulcanizing press or equivalent apparatus and subjected to a pressure of approximately 300 psi and kept at a temperature of 290° F. for approximately 15 minutes. The cured material is then removed from the press and allowed to cool. Its edges are then trimmed to the final desired dimensions and the trimmed edges are buffed to provide a finished appearance.

While hereinabove a specific fluoroplastic film has been mentioned as the material having a low coefficient of friction, it will be understood that this is merely by way of example and as a specific illustration of the utility of the present invention.

I claim:

1. A method of bonding a surface material comprised of fluoroplastic film having a low coefficient of friction to a rubber substrate which comprises as steps; buffing the surface of the substrate, providing bonding material comprising textile fabric impregnated with an uncured phenolic resin, interposing a piece of the bonding material between the substrate and the surface material and vulcanizing the assembly thereby, while curing the resin, to permanently bonding the surface material to the substrate.

2. The method according to claim 1, further characterized in that, in curing the bonding material, the assembled parts are subjected to a pressure of approximately 300 psi at a temperature of the order of 290° F., and maintaining said pressure until the bonding material has been cured.

3. The method according to claim 2, and wherein the surface material is a fluorocarbon sheet, further characterized in that the textile fabric in the bonding material is a cotton canvas of a weight in excess of 4 ounces per square yard and of a yarn count of approximately 56 warp yarns and 24 double filling yarns per inch.

4. The method according to claim 1, further characterized in cutting the surface material to a size such that when placed upon the bonding layer it overlaps the latter approximately one-fourth inch all around, cooling the cured material after removal from the press, and then trimming the edges to the final desired dimensions.

5. The method according to claim 4, further characterized in buffing the edges after trimming.

* * * * *